Feb. 13, 1968  JEAN-PHILIPPE MANGIN  3,368,408
SAMPLE-TAKING APPARATUS FOR RIVERS AND STREAMS
Filed May 19, 1966  2 Sheets-Sheet 2
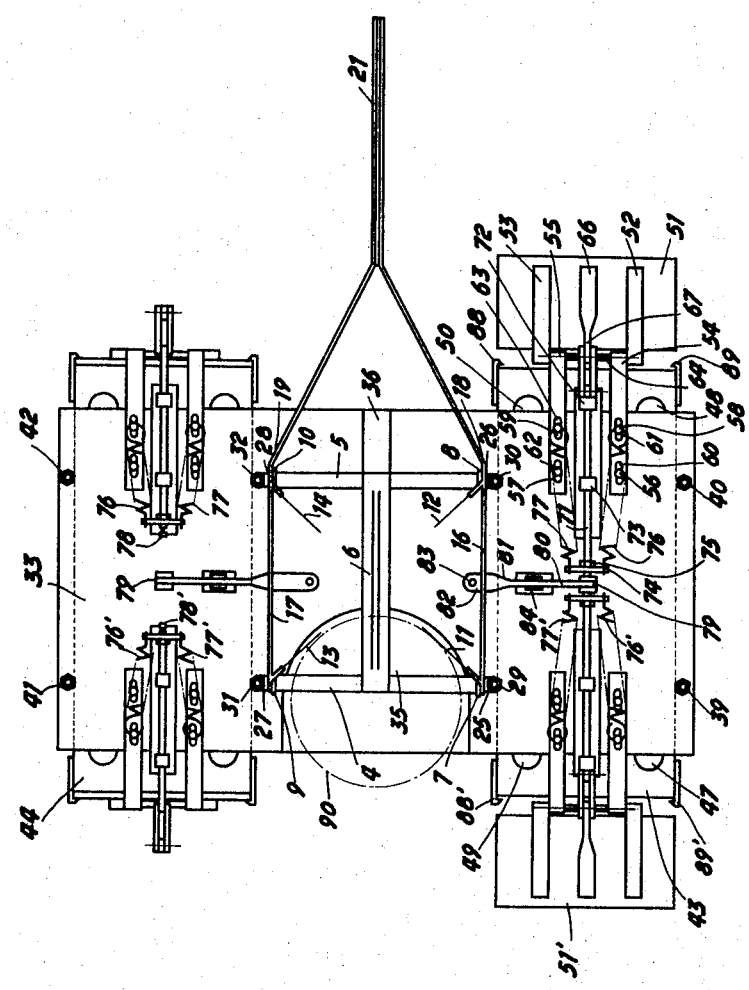

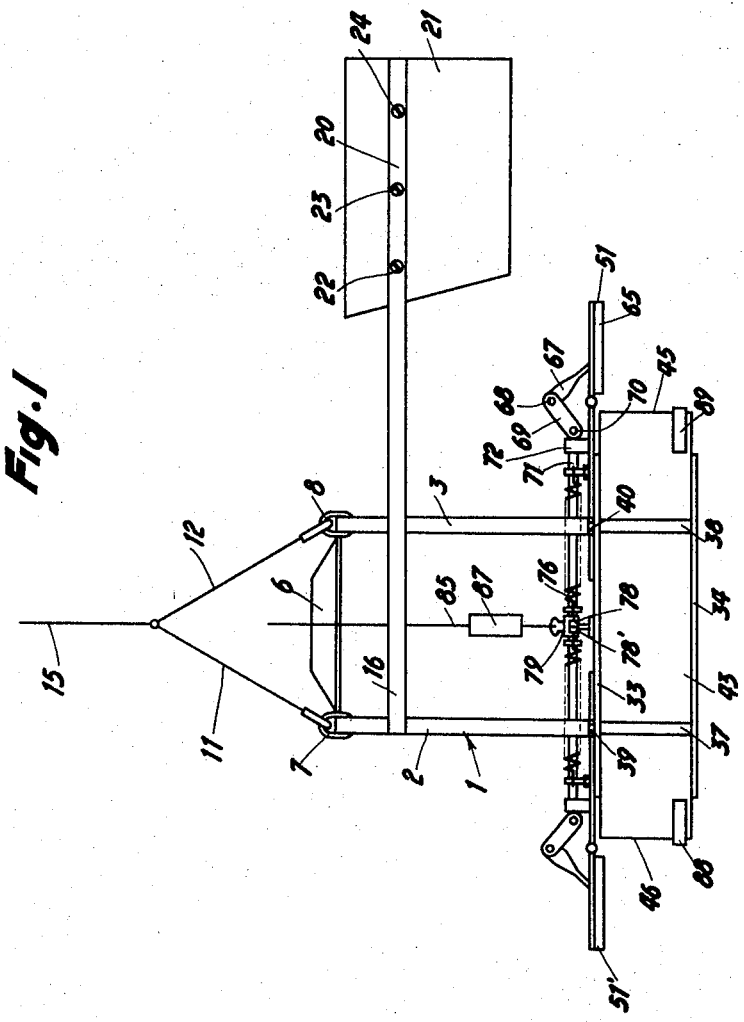

United States Patent Office 3,368,408
Patented Feb. 13, 1968

3,368,408
SAMPLE-TAKING APPARATUS FOR
RIVERS AND STREAMS
Jean Philippe Mangin, Talant, France, assignor to Etablissement Public: Centre National de la Recherche Scientifique, Paris, France, a corporation of France
Filed May 19, 1966, Ser. No. 551,330
Claims priority, application France, May 20, 1965, 17,795
6 Claims. (Cl. 73—425.4)

The present invention relates to an apparatus for taking samples in a liquid medium as well as for measuring physical parameters in such a medium, and more particularly to an apparatus enabling a certain amount of liquid to be isolated and removed under predetermined physical conditions from a medium such as a river, sea or the like, to which access is difficult.

According to a known method for taking such samples an ordinary container, provided with sinkers and suspended from a cable, is immersed into the river or other medium and thereafter raised to the surface to analyze the liquid and solid materials thus brought up.

According to a slightly more exact method, which is limited to collecting liquid samples, bottles are used, which may be provided with apparatus for measuring the temperature, and which are lowered vertically into the medium. A device allowing said bottles to be tipped over at the point samples are being taken can also be provided so that the filling operation only starts at the exact moment and site the operator wishes.

In the case, for instance, of a non-homogenous medium such as a river, the moving water is likely to contain solid materials such as sand, rock fragments, vegetable or animal materials, or dissolved ingredients.

In order to carry out an accurate study of such media it is therefore necessary not to take any random mixture of said water and of the accompanying materials, but to "isolate" a portion of the current at a predetermined site and under exact physical conditions, and without disturbing the current. Such a result is obviously impossible when the above mentioned types of apparatus are used.

The main object of this invention is to provide an apparatus which allows a portion of the liquid in a medium to be isolated under predetermined physical conditions and without disturbing this medium, in order to take samples therefrom.

This and other objects are made clearly apparent in the following specification, reference being had to the appended drawings in which:

FIG. 1 is a diagrammatic, side elevational view of an embodiment of the apparatus according to the invention;

FIG. 2 shows the apparatus of FIG. 1, viewed from above.

The apparatus as shown is essentially intended to be immersed in a liquid medium such as a river, canal or sea, the operator remaining above the surface of said medium, on a bridge over the river, or in a boat, for instance.

The apparatus comprises a parallelepipedic suspension cage generally indicated at 1 formed of two vertical U-shaped frames, the upright arms of which are shown at 2 and 3, and the horizontal arms at 4 and 5 (FIG. 2), respectively. Said two upright frames are assembled by means of a T-section bar 6 the ends of which are welded at the middle portion of horizontal arms 4 and 5.

The upper corners of said suspension cage are provided with rings 7, 8, 9, 10, through which cables such as 11, 12, 13, 14 connected to a main cable 15 can be passed. On two opposite side surfaces of said suspension cage are secured flat rods 16 and 17, respectively, which extend out of the cage on one side thereof and are bent at 18 and 19 so as to their free ends 20 may hold a fin 21 formed of a trapezoidal metal plate secured to said free ends 20 of rods 16 and 17 by means of three screws 22, 23, and 24.

Said fin 21 is adapted to orient the apparatus when it is immersed in an unstable medium, such as a river for instance, in the direction of the current. Therefore, the front of the apparatus will be taken as being the portion situated on the upstream side, and the back of the apparatus as being that situated downstream, that is to say, on the same side as fin 21.

The lower ends of the vertical arms 2 and 3 of the suspension cage are bent back at right angles to form lugs 25, 26, 27, 28, which are secured by means of four screws 29, 30, 31, 32 to the main portion of the apparatus which will now be described.

Said main portion includes two rectangular top and bottom metal plates 33, 34 of the same size, placed parallel to and facing each other. In its middle part, top plate 33 is cut to form a rounded hollowed out portion 35 opening on the front side thereof and a smaller, rectangular hollowed out portion 36 opening on the opposite, back side. Said cut out portions are used for housing collectors adapted to measure the water flow, pH, etc., as will be seen hereinafter. The bottom plate 34 has no opening. It is used essentially as a floor for collecting solid material from the river.

Spacing and support of said two plates 33 and 34 are ensured by eight tie-rods such as shown at 37 and 38 (FIG. 1). Four of said tie-rods are secured to top plate 33 by means of nuts 39, 40, 41, 42 while the remaining form are secured by means of nuts 29, 30, 31, 32 which also secure suspension cage 1.

Between the two plates 33 and 34 are placed two removable parallelepipedic box-like structures 43, 44, preferably made of plastic material, open at both ends such as 45, 46 for tube 43 (FIG. 1). The dimensions of structures 43, 44 are such that they can be inserted on both sides of the four tie-rods to which the upright arms of the suspension cage are secured.

Structures 43 and 44 are identical, as are the mechanisms associated therewith. Said mechanisms have been shown in two different states on tubes 43 and 44, respectively, for a better understanding of their operation.

The following description of said mechanisms is made with reference to structure 43, which is that shown in the open state at FIGURE 1, structure 44 being shown in the closed state at FIG. 2 and the same description applying thereto. Said structures shall be referred to hereinafter as tubes.

Tube 43 is held within the spaced limited by plates 33 and 34 and by the four tie bars at the corresponding ends of said plates, by means of four semi-circular pads 47, 48, 49, 50 of plastic material, bonded to the top side of said tube at points corresponding to the front and rear sides of plate 33. Said pads prevent the tube from moving in a longitudinal direction. Lateral movement, as has been seen, is not possible owing to the tie-rods, between which the tubes 43 and 44, respectively, are placed.

Two units are secured to plate 33 for sealing the ends of tubes. As above mentioned, one has been shown in the closed position for tube 44, the other in the open position for tube 43, and it is in that latter position that the description will be continued.

It will also be noted that each tube sealing unit comprises two symmetrical portions and only the portion for sealing the rear end 45 of tube 43 will be particularly described hereinafter, the same parts in the other portion being designated by the same reference numerals with a prime.

A gate 51 is arranged adjacent to end 45 of tube 43: said gate is rectangular in shape and is pivotable about one of its sides by means of two hinges, straps 52 and 53 which are secured to gate 51 while the other straps 54, 55 are secured to top plate 33 by means of bolts 56, 57 and 58, 59 which engage through slots 60, 61, and 62, 63 formed in straps 54 and 55, respectively. The position of said straps may thus be adjusted lengthwise of tube 43 so as to enable exactly adapting sealing gate 51 to the end of tube 43.

The surface of gate 51, which is adapted to face the end of tube 43 by pivoting about axis 64 of the hinges, is provided with a plate 65 (FIG. 1) of a resilient material such as foam rubber for instance. Said plate 65 should preferably be as thin as possible so as to avoid eddies around the end openings of tube 43.

A lever 67 is secured at an end portion 66 onto gate 51. The opposite end of said lever is connected by means of an axis 68 to a small rod 69 linked in its turn by means of a shaft 70 to the end of a sliding rod 71.

Said rod 71 is slidably mounted in bores formed in two guide pieces 72 and 73 secured to top plate 33. The end of rod 71 is threaded to receive a nut 75 fast with a small plate 74. Nut 75 may be more or less screwed on said threaded end to produce translation of plate 74.

On plate 74 are secured the ends of two springs 76 and 77, the other two ends of which are hooked on extensions of bolts 58 and 59, which secure straps 54 and 55 of the hinges of gate 51. The translation movement of plate 74 enables control of the tension of springs 76 and 77.

On the threaded end of piston 71 is also screwed a nut 78 which may be capped by a jaw 79, in the same way as nut 78' belonging to the portion of the closing mechanism which corresponds to end 46 of tube 43. Said jaw 79 is secured to the end of one arm 80 of a two-armed lever 81, the other arm of which includes a planar portion 82 provided with an aperture 83. Lever 81 rocks about a shaft 84 secured to top plate 33.

The operation of the above described mechanism may be easily understood.

In the open position piston 71 is drawn back against the action of springs 76 and 77 to such a position that nut 78 (and also nut 78') may be capped by jaw 79. The closing operation is carried out by pressing down arm 82 of lever 81 causing nut 78 (and nut 78') to be freed and gate 51 (and gate 51') to be closed by the action of springs 76 and 77 (and springs 76' and 77'). This operation is carried out by remote control in the following manner:

A wire 85 is provided for each closing control of tubes 43 and 44, leading from the operator to a hook-on member (not shown) on plate 33 and passing through aperture 85 in arm 82 of lever 81. A weight or "messenger" 87 of cylindrical shape, for instance, is provided with a central channel through which guide wire 85 passes. When this messenger is released at the operator end of the guide wire at the desired moment, it slides along the wire and strikes arm 82 of the lever adjacent to aperture 83, causing the sudden closing of tube 43 as has been explained hereinabove. The same control system is provided for tube 44.

In the case of it being desired that the two tubes 43 and 44 be closed simultaneously, only one messenger could be used on condition that the two levers 80, 82 pertaining to both tubes 43 and 44 are mechanically connected.

In order to ensure sealing of a tube without the necessity of a permanent action of springs such as 76, 77, a locking system is provided for each gate by means of two pawls 88 and 89 each consisting of a flat flexible rod the end of which has been bent back. Said pawls are secured laterally onto bottom plate 34.

A current speed measuring apparatus 90 may be placed at the front of the apparatus and in the semi-circular housing 35 formed between the two sampling tubes 43, 44. Other apparatus may be placed at the rear of the apparatus in the small housing 36 facing the circular housing, such as thermocouples for measuring the temperature, samplers for measuring the pH, etc. (These are not shown in the drawing.)

In order to take samples, in a river for instance, the device is lowered by means of the supporting cable 15 to which may be attached an electric conductor, not shown, enabling electrical information given by the measuring apparatus to be transmitted.

The device is submerged in the river, the gates of tubes 43 and 44 having been previously opened and placed parallel to the longitudinal direction of the two tubes. The two jaws 79 cap nuts such as 78, 78', maintaining slide rods 71, 71' in the open-gates position. Owing to the presence of fin 21, the apparatus is automatically correctly positioned in the direction of the current.

In certain experiments it is desirable to take samples from the river bed; in this case the apparatus is lowered until it touches said river bed (which is easily checked by the release of the tension of the supporting cable). Owing to the rectangular base plate 34 being thin, and to the parallelepipedic shape of tubes 43 and 44 the samples may be taken as close to the bed as desired.

Once the apparatus is in position at the depth required by the experimenter and the physical conditions of sample taking as regards temperature, pH of the medium to be sampled, etc., are realized, messenger 87 is dispatched along guiding cable 85. At the end of its run it strikes the end of control lever 81 which frees the two nuts 78, 78' and suddenly closes both ends of tube 43, confining an amount of liquid. The composition of this liquid is not disturbed by the closing operation owing to the rapidity thereof.

The same operation is carried out with tube 44, either at the same sampling level or at a different position according to the requirements of the experiment.

It can be seen that the apparatus thus designed has the advantage of causing only a very slight disturbance in the medium in which the samples are taken. It allows a portion of the liquid flow, of the same nature as that which could exist without the apparatus being placed in position, to be isolated at a predetermined moment.

Indeed, owing to the shape of the sampling tubes and the placing of the gates in the open position the apparatus offers a practically negligible cross-section to the current once it has been positioned by fin 21. The current is not disturbed and continues to flow through sampling tubes 43 and 44.

The apparatus is very reliable in operation.

The system for closing the gates is designed to prevent any untimely closing of same. Indeed, it will be seen that no accidental tension on the wire controlling this operation can actuate the closure system. This is particularly important in a liquid medium such as a river which may carry objects such as tree branches, for instance, which could catch on the said wire and produce an accidental tension thereof.

The apparatus is of simple design, cheap, not cumbersome and very reliable in operation.

It is understood that the invention is not limited to the embodiment described and shown, which has been given simply by way of example.

What I claim is:

1. A device for isolating and taking at least one sample of given volume from a liquid medium comprising at least one tube member having a rectilinear longitudinal axis and two open ends, a gate member hingedly mounted adjacent each of said open ends of said tube member and adapted to alternately occupy an open position in which said gate member is held parallel with said longitudinal axis of said tube, and a closed position in which said gate tightly seals said adjacent open end, resilient means permanently urging said gate member from said open position to said closed position, remote controlled, releasable latch means for holding simultaneously both gate members at said ends of said tube in said open position against the action of said resilient menas, said latch means being adapted to release simultaneously both said gate members under remote control, and supporting means for suspending said tube member in said liquid member.

2. A device as claimed in claim 1, in which said tube member is of substantially parallelepipedic shape.

3. A device as claimed in claim 1, in which each of said gates is provided with a water-tight lining adapted to cooperate with said adjacent open end.

4. A device as claimed in claim 1, in which said latch means comprise, for each gate member, a rod mounted for longitudinal sliding with respect to said tube, substantially parallel with said longitudinal axis of said tube member, said rod having one end linked by lever means to said gate member and another end provided with a catch member, and a single latch member adapted to cooperate with said catch member of both said sliding rods for holding said rods against the action of said resilient means, and remote control means for acting upon said latch member to simultaneously release said catch members.

5. An apparatus as claimed in claim 1, in which said tube is removably held in a cage structure, said gate members being hingedly connected to said cage structure and said supporting means being attached to said cage structure.

6. An apparatus as claimed in claim 1, comprising a vane secured parallel to said longitudinal axis of said tube.

References Cited

UNITED STATES PATENTS

| | | | |
|---|---|---|---|
| 1,511,223 | 10/1924 | Chapelle | 73—425.4 |
| 1,585,072 | 5/1926 | Banks | 73—425.4 |
| 2,137,128 | 11/1938 | Blake | 73—425.4 |
| 2,298,350 | 10/1942 | Davidson | 73—425.4 |
| 2,298,627 | 10/1942 | Proudman et al. | 73—425.4 |

LOUIS R. PRINCE, *Primary Examiner.*

S. C. SWISHER, *Assistant Examiner.*